US009667320B2

(12) United States Patent
Schneider et al.

(10) Patent No.: US 9,667,320 B2
(45) Date of Patent: May 30, 2017

(54) POWER LINE COMMUNICATION MODEM, POWER LINE COMMUNICATION SYSTEM, POWER LINE COMMUNICATION METHOD

(71) Applicant: Sony Corporation, Tokyo (JP)

(72) Inventors: Daniel Schneider, Stuttgart (DE); Andreas Schwager, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/525,897

(22) Filed: Oct. 28, 2014

(65) Prior Publication Data

US 2015/0117503 A1 Apr. 30, 2015

Related U.S. Application Data

(63) Continuation of application No. 13/465,420, filed on May 7, 2012, now Pat. No. 8,902,957.

(30) Foreign Application Priority Data

May 16, 2011 (EP) .................................... 11004046

(51) Int. Cl.
*H04B 1/38* (2015.01)
*H04L 5/16* (2006.01)
(Continued)

(52) U.S. Cl.
CPC .............. *H04B 3/544* (2013.01); *H04B 3/54* (2013.01); *H04B 3/56* (2013.01); *H04B 2203/5454* (2013.01); *H04B 2203/5466* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 2006/0097573 | A1* | 5/2006 | Gidge et al. | 307/3 |
| 2007/0002772 | A1* | 1/2007 | Berkman | H04B 3/54 |
| | | | | 370/257 |

(Continued)

FOREIGN PATENT DOCUMENTS

| | | | |
|---|---|---|---|
| EP | 1 217 760 A1 | | 6/2002 |
| EP | 2 028 769 A1 | | 2/2009 |
| WO | WO 2011/001430 A2 | | 1/2011 |

OTHER PUBLICATIONS

Extended European Search Report issued Sep. 6, 2012 in Patent Application No. 12000138.3.

(Continued)

*Primary Examiner* — Wednel Cadeau
(74) *Attorney, Agent, or Firm* — Oblon, McClelland, Maier & Neustadt, L.L.P.

(57) ABSTRACT

A power line communication modem is provided, including a connection element configured to connect the power line communication modem to at least three wires of a power line network; a transmitter configured to transmit a first signal via a first combination of at least two wires of the at least three wires and to transmit a second signal via a second combination of at least two wires of the at least three wires; a controller adapted to individually control a transmit power of the first signal and the second signal. A corresponding power line communication system and a power line communication method are provided as well.

15 Claims, 7 Drawing Sheets

(51) Int. Cl.
   *H04B 3/54*      (2006.01)
   *H04B 3/56*      (2006.01)

(56) References Cited

U.S. PATENT DOCUMENTS

| | | | |
|---|---|---|---|
| 2008/0057866 A1* | 3/2008 | Schwager | H04B 3/54 |
| | | | 455/41.1 |
| 2009/0295551 A1* | 12/2009 | Dickey | H02J 4/00 |
| | | | 340/568.2 |
| 2011/0026621 A1 | 2/2011 | Kim et al. | |
| 2011/0206140 A1* | 8/2011 | Schwager | H04B 3/30 |
| | | | 375/257 |
| 2012/0161543 A1 | 6/2012 | Reuven et al. | |
| 2012/0163435 A1 | 6/2012 | Reuven et al. | |
| 2012/0177132 A1 | 7/2012 | Reuven et al. | |

OTHER PUBLICATIONS

"Power Line Telecommunications (PLT) Channel characterization and measurement methods", ETSI TR 102 175 v1.1.1, Mar. 2003, 13 pages.

* cited by examiner

POWER LINE COMMUNICATION MODEM, POWER LINE COMMUNICATION SYSTEM, POWER LINE COMMUNICATION METHOD

CROSS REFERENCE TO RELATED APPLICATION

This application is a continuation of U.S. application Ser. No. 13/465,420 filed May 7, 2012, the contents of which are incorporated herein by reference in its entirety. U.S. application Ser. No. 13/465,420 claims priority to European Patent Application No. 11004046.6, filed on May 16, 2011.

The invention relates to a power line communication modem, to a power line communication system and to a power line communication method.

BACKGROUND

Power line communication (PLC), also called mains communication, power line transmission (PLT), broadband power line (BPL), power band or power line networking (PLN), is a term describing several different systems for using power distribution wires or power lines for simultaneous distribution of data. A carrier can communicate voice and data by superimposing an analogue signal over the standard 50 Hz or 60 Hz alternating current (AC). For indoor applications PLC equipment can use household electrical power wiring as a transmission medium.

In order to increase the bandwidth of PLC systems it has been proposed to use multiple-input-multiple output schemes (MIMO) which are known from wireless communication systems. In general, household power line networks include at least three different wires or lines that are named "phase", "neutral", and "protective earth". In MIMO schemes, data is transmitted via those wires by transmitting differential signals on different combination of the wires, e.g. between phase and neutral (PN), phase and protective earth (PE), and/or neutral and protective earth (NE).

Since MIMO PLC might influence reception of radio broadcasts or amateur radio broadcast, it is intended to define levels of MIMO feeding in the future.

Therefore, there is a need to provide a power line communications modem, a power line communications system and a power line communications method that allow data transmission with a high throughput while taking into account regulatory limits in order to avoid disturbances.

The object is solved by a power line communications modem, a power line communications system and a power line communication method as defined in the appended claims. Further embodiments are defined in the dependent claims, respectively.

Details of the invention will become more apparent from the following description of embodiments in connection with the accompanying drawings.

DETAILED DESCRIPTION

In the following, embodiments of the invention are described. It is important to note that all described embodiments in the following may be combined in any way, i.e. there is no limitation that certain described embodiments may not be combined with others.

Figure 1:
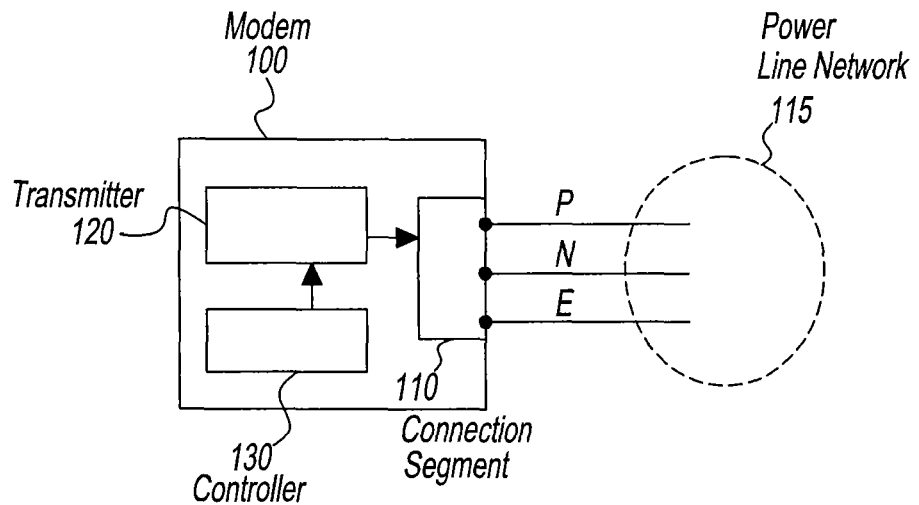
FIG. 1 shows a schematic block diagram of a power line modem according to an embodiment of the invention.

In FIG. 1 there is depicted schematically a power line communication modem 100 according to an embodiment of the invention. The power line communication modem 100 includes a connection element 110 configured to connect the power line communication modem 100 to at least three wires of a power line network 115, e.g. in a household. In many households three of those at least three wires are named "phase" line (P), "neutral" line (N) and "protective earth" line (PE or E).

The power line communication modem 100 further includes a transmitter 120 that is configured to transmit a first signal via a first combination of at least two wires of the at least three wires, e.g. between the phase line and the neutral line (PN), and to transmit a second signal via a second combination of at least two wires of the at least three wires, e.g. between the protective earth line and the phase line (EP) or between the neutral line and the protective earth line (NE). However, it might be possible that more than three lines are available in the power line network of a building, e.g. for high power appliances. In those cases, combinations of two lines of e.g. four or five lines are possible. It is also possible that two of the at least three wires might be grouped or connected and the signal is fed between the group of wires and the third wire.

When transmitting two signals via different combinations of wires it is possible to implement multiple-input-multiple output (MIMO) coding schemes for transmitting payload data from a first power line communication modem 100 to a second power line communication modem. MIMO coding schemes result in higher bandwidth in power line communication.

For three lines (e.g. phase line, neutral line and protective earth line) three combinations for two lines are possible, i.e. phase-neutral (PN), protective earth-phase (EP), neutral-protective earth (NE). It is possible for MIMO-schemes to use all three combinations, i.e. with a first signal at the first combination, a second signal at the second combination and a third signal at the third combination, however, due to Kirchhoff's law only two of them can be used independently at the same time.

The first, second and third signal generally are fed in differential mode (DM).

The power line communication modem 100 further includes a controller 130 that is adapted to individually control a transmit power of the first signal and the second signal. The "transmit power" might also be referred to as "power spectral density (PSD)".

With the help of the controller 130 it is possible to transmit the first signal and second signal with different transmit power.

Figure 2:
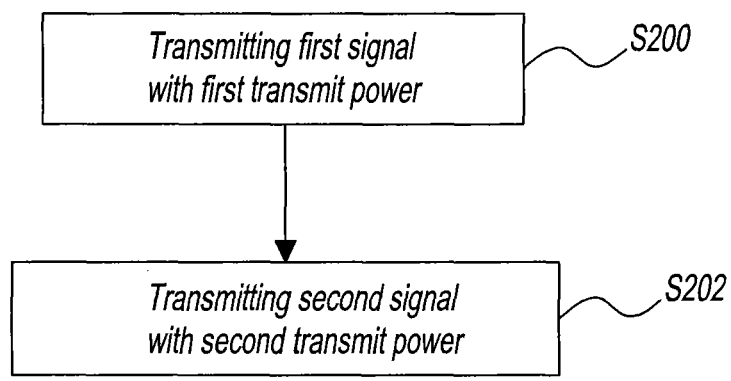
FIG. 2 shows a schematic flow diagram of a power line communications method according to a further embodiment of the invention.

Accordingly in FIG. 2 it is schematically depicted that in a step S200 the first signal is transmitted with a first transmit power and in step S202 the second signal is transmitted with a second transmit power.

If the transmit power of the first signal and the second signal is adjusted according to their potential of interference to radio receivers, it is possible to transmit a signal with less radiation with a higher transmit power, resulting in the possibility of using e.g. higher constellations in adaptive OFDM (orthogonal frequency division multiplexing) schemes or simply in resulting in higher signal to noise ratios (SNR) achieving higher bandwidth than when feeding the signals with the same transmit power for all possible combinations. If all possible combinations were fed with the same transmit power, in order to guarantee regulatory requirements (which today do not distinguish between the different combinations), the single transmit power would have to be adjusted in accordance with the combination that radiates most. The potential of interference to other radio services might be location dependent; so that the difference of the transmitted transmit powers might be adapted to the different locations.

Figure 3:
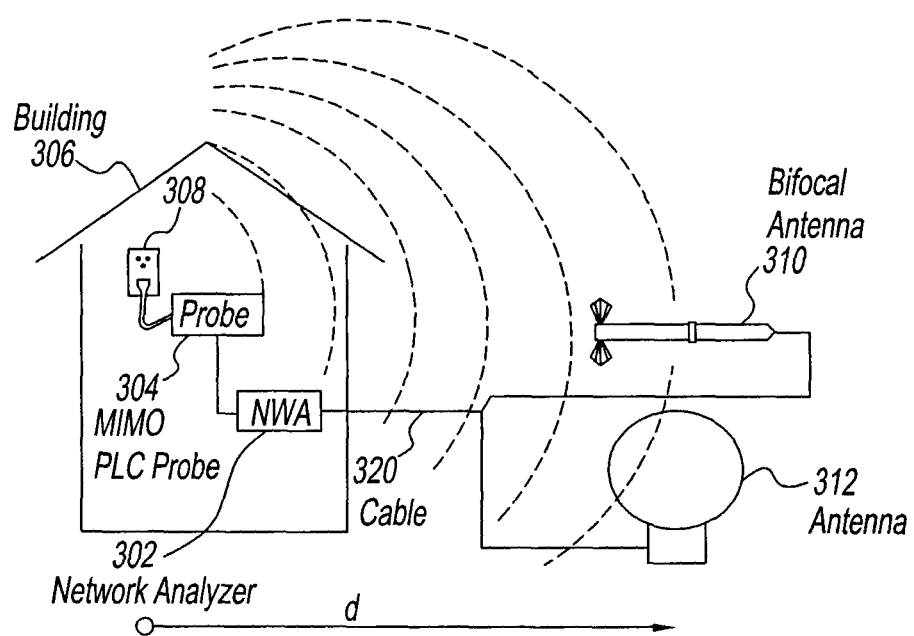
FIG. 3 shows schematically a measurement setup to determine the radiation of feeding into different combinations of wires.

Measurements were undertaken to record the interference potential from MIMO PLC. The measurement set-up depicted in FIG. 3 consisted of a Network Analyzer NWA 302 connected with a MIMO PLC probe 304 to the mains of a building 306 via an outlet 308. The power supply of the Network Analyzer 302 was isolated from the buildings mains grid. The Network Analyzer 302 fed signals into the mains using a MIMO PLC probe 304. All possible potential feeding possibilities (PN, NE, EP) were examined. For comparison common mode (CM) signals were also fed.

For receiving the signals an antenna 310, 312 was located in- or outside the building 306 at various distances d from the injecting outlet 308. Depending on the frequencies of interests a magnetic loop antenna 312 (for frequencies below 30 MHz) or a biconal antenna 310 (frequencies between 1 MHz and 100 MHz) was used. The link (cable) 320 from the antenna to the Network Analyzer 302 was filtered from common mode signals. Otherwise the signal ingress into the cable 320 might affect the measurement.

The outlets 308 used for feeding the signals were arbitrary selected in the building 306.

Figure 4:
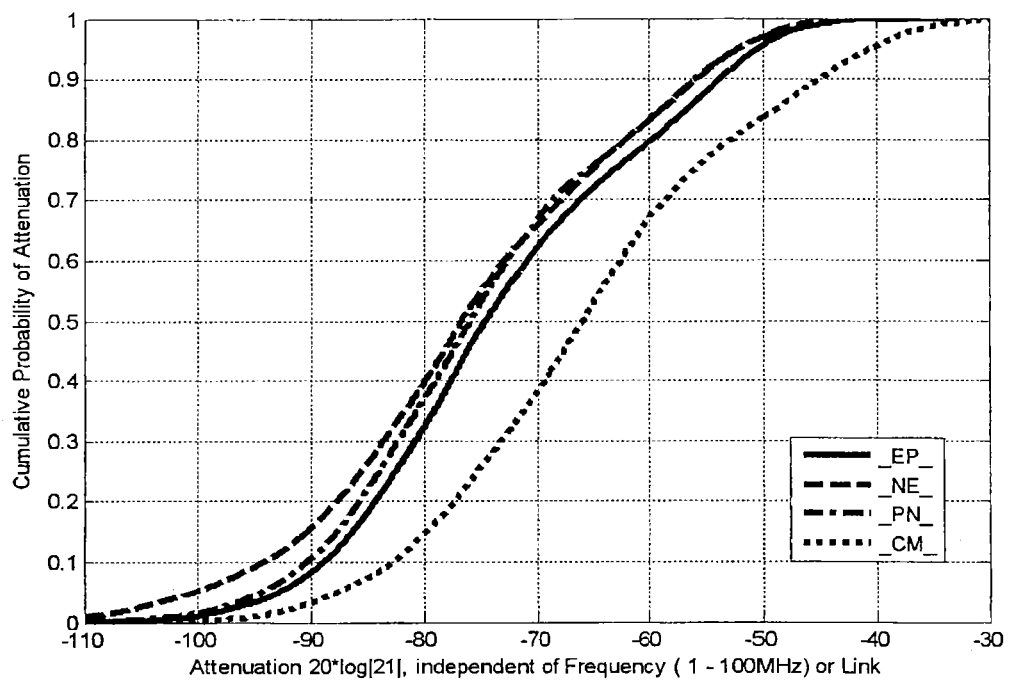
FIG. 4 shows a measurement result obtained for feeding PLC signals into different combination of wires using a delta style coupler.
Figure 5:
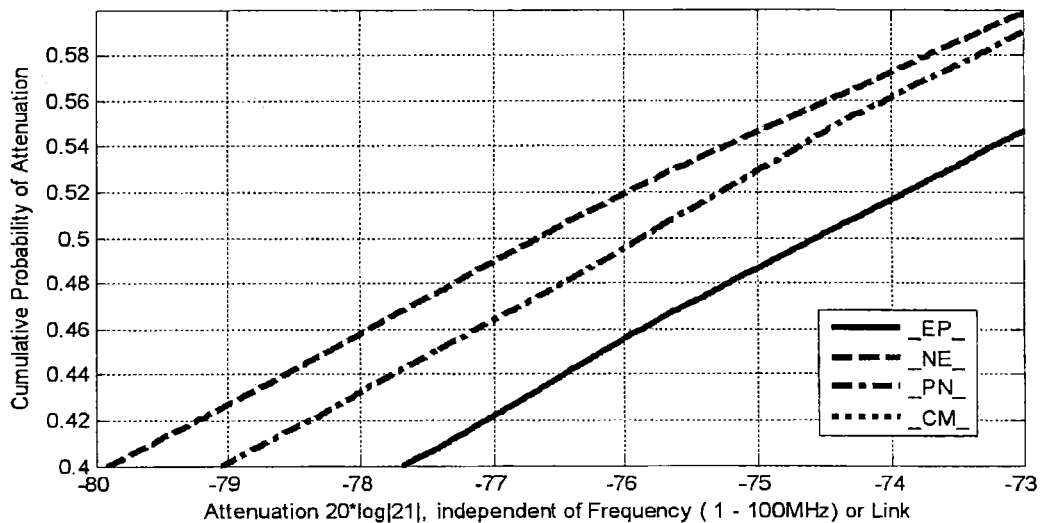
FIG. 5 shows an enlarged detail of the measurement result depicted in FIG. 4.

FIGS. 4 and 5, wherein FIG. 5 shows only a part of FIG. 4, show the attenuation (the scattering parameter S21 (forward gain) in dB) recorded by the Network Analyzer 302 of more than 100000 measurements for each combination of wires independent of frequency and feeding plug or outlet 308 at several buildings 306.

In FIG. 4 and FIG. 5 the attenuation from feeding to an outlet 308 to the reception of the signals at an antenna 310, 312 is depicted. For comparison, differential mode feeding in EP (protective earth line-phase line) is presented with a solid line, NE (neutral line-protective earth line) is a dashed line, PN (phase line-neutral line) is a dashed-dotted line and the common mode is the dotted line. The x-axis shows the S21 parameter from −110 dB to −30 dB. The y-axis shows the cumulative probability of the attenuation. For instance, for 100% (all) of the values the attenuation is higher than 30 dB and for 0% (none) of all values the attenuation is higher than 110 dB. The negative sign of the S21 parameter reflects that the signal at the antenna 310, 312 is attenuated as compared to the fed signal at the outlet 308. As more left the lines are in these figures as higher is the attenuation, as lower is the radiation or the interference potential. It can be seen that signals feed in common mode do radiate most.

FIG. 5, which is zoomed into a part of FIG. 4, helps in identifying the differences between the 3 differential mode feedings.

Feeding in EP (protective earth-phase line) causes 1.3 dB more radiation compared to feeding in PN (phase-neutral). Feeding into NE (neutral-protective earth) causes 0.8 dB less radiation than feeding to PN (phase-neutral) at the 50%-point.

Consequently, when potential of interference for all feeding styles should be considered identical, power line communication modems can improve their transmission characteristics by adopting their individual feeding power spectral density (PSD).

Figure 6:
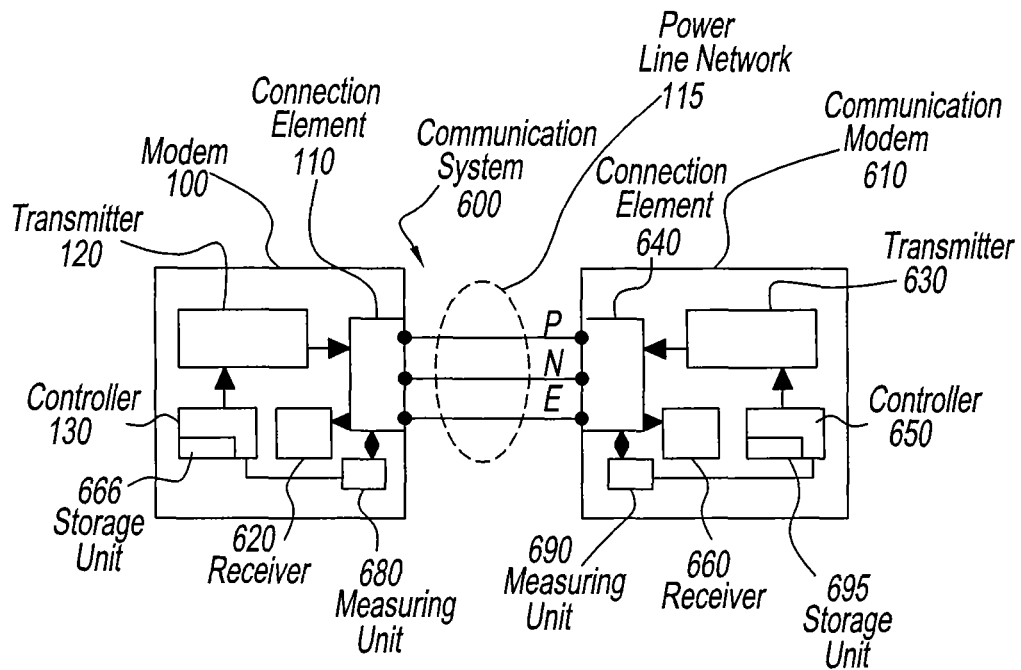
FIG. 6 shows a schematic block diagram of a power line communications system according to a further embodiment of the invention.

In FIG. 6 a power line communication system 600 is schematically depicted. It includes the first power line communication modem 100 and a second power line communication modem 610, which are connected via the power line network 115, in FIG. 6 represented by the three lines phase (P), neutral (N) and protective earth (E).

The first power line communication modem 100 further includes a receiver 620 adapted to receive signals transmitted from a transmitter 630 of the second power line communication modem 610. The transmitter 630 of the second power line communication modem is connected via a connecting element 640 of the second power line communication modem 610 to the power line network 115.

The second power line communication modem 610 further includes a controller 650 adapted to control individually the transmit power of signals that are transmitted by the transmitter 610 via different combinations of wires P, N, PE and a receiver 660 adapted to receive signals transmitted from the first transmitter 120.

The first power line communication modem 100 might further include a storage unit 666 adapted to store a power difference value and the controller 130 is further adapted to feed the first signal and second signal with respective transmit powers that are distinguished by the stored power difference value. Instead of the power difference value also a power quotient value might be stored in the storage unit 666 and the controller 130 might be adapted to feed the first signal and the second signal with transmit powers that are distinguished by the stored power quotient value. The stored power difference value or the stored power quotient value might be frequency independent, since the measurements did not show any particular frequency dependency of the different radiation properties of the different combinations of wires.

The stored power difference value or the stored power quotient value might be used as a constant, predetermined value that is not changed during the lifetime of the power line communication modem, which would result in an easy implementation, since no updating is necessary. More sophisticated approaches, however, might include updating of the power difference value or the power quotient value, e.g. for certain particular radiation characteristics of the power line network or for considering amended regulatory limits.

According to an embodiment of the invention the controller 130 might be adapted to feed a signal via the combination EP of the protective earth line E and the phase line P with 1 dB less transmit power than a signal via the combination PN of the phase line P and the neutral line N, which reflects the measurement results depicted in FIG. 5 that signals transmitted via the combination PN of the phase line P and the neutral N show a higher attenuation of the received signal of approximately 1 dB due to lower radiation than signals transmitted via the combination EP of the protective earth line E and the phase line P.

According to a further embodiment of the invention the controller 130 might be adapted to feed a signal via the combination NE of the neutral line N and the protective earth line E with 1 dB more transmit power than a signal via the combination PN of the phase line P and the neutral line N, which reflects the measurement results depicted in FIG. 5 that signals transmitted via the combination NE of the neutral line N and the protective earth line E show a higher attenuation of the received signal of approximately 1 dB due to lower radiation than signals transmitted via the combination PN of the phase line P and the neutral line N.

For comparison of different feeding possibilities, in the following a feeding between the phase line P and the neutral line N, without stating otherwise, is meant to describe a feeding according to single-input single-output (SISO) schemes currently used, i.e. feeding differentially between the phase line P and the neutral line N without termination towards the protective earth line or with a left open connection towards protective earth.

The 1 dB difference between the respective transmit powers might also be referred to as a possible power quotient value.

According to a further embodiment the first power line communication modem 100 might include a measuring unit 680, and the second power line communication modem 610 might include a measuring unit 690, respectively, adapted to measure the voltages between the at least three lines P, N, E and is further adapted to determine the phase line and the neutral line based on measuring the voltages. In power line networks 115, where it is not certain, which of the wires is the phase line P and the neutral line N, it is possible to determine the phase line and the neutral line among the wires of the power line network and to adapt the transmit power of the combinations accordingly by the controller 130. For instance, in some countries (France, Switzerland, United States of America) the mechanical construction of a power outlet 308 and the electrical plug enforce the orientation of the phase, neutral and protective earth line. In other countries (Germany) the plug can be inserted in two orientations into the outlet 308. Here it is unknown to the power line communication modem 100, 610 at which conductor the phase line P or neutral line N is connected to. The protective earth line E is fixed, the other two connectors might be toggled. Since it is known that the supply voltage AC (230 V or 110 V) is present between the phase line P and the neutral line N and between the phase line P and the protective earth line E, whereas between the neutral line N and the protective earth line E the voltage is 0V, it can be determined which of the lines or wires is the phase line P.

The second power line communication modem 610 might also include a storage unit 695 adapted to perform functions as the storage unit 666 of the first power line communication modem 100.

Figure 7:
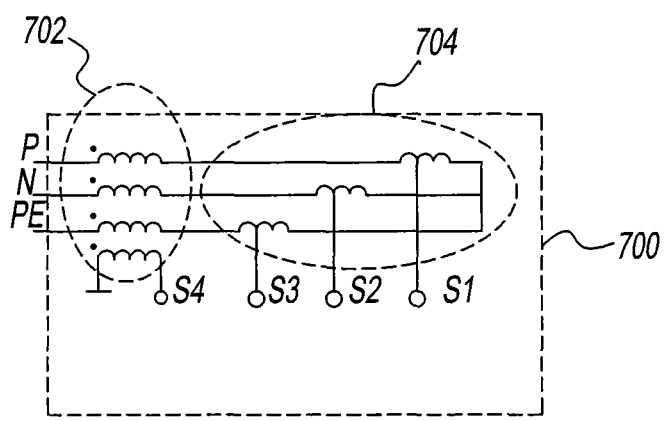
FIG. 7 shows a star style coupler (probe) to feed/receive signals to or from individual wires of the mains.

FIG. 7 shows a star-style MIMO PLC probe 700. It is mainly intended for receiving only. The CM choke 702 blocks the common mode current from the star transformers 704. The choke 702 simultaneously acts as a transformer which allows the reception of the CM signal. The signals on S1, S2 or S3 are directly coupled onto the individual wires P, N, PE.

Figure 8:
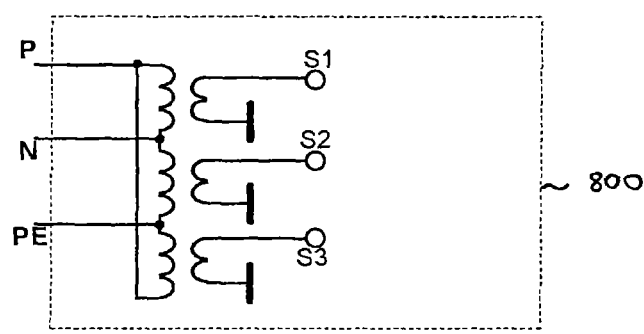
FIG. 8 shows a delta style coupler (probe) to feed/receive signals differentially to or from a pair of wires of the mains.

FIG. 8 shows a delta style coupler 800. The signals S1, S2 or S3 create the differential voltages $U_{P-N}$, $U_{N-PE}$ and $U_{PE-P}$.

Figure 9:
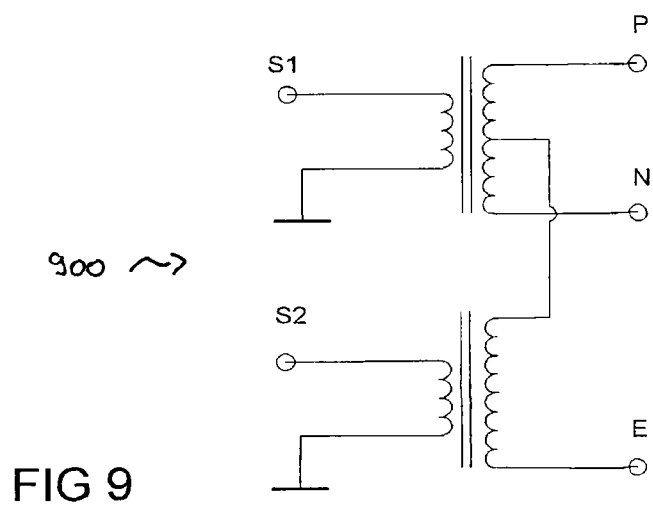
FIG. 9 shows a T-style coupler to feed/receive a first signal differentially to or from a pair of wires and a second signal differentially between a third wire and the other pair of wires.

FIG. 9 shows a T-style coupler 900 where the first signal is coupled differentially between two of the three wires and the second signal is coupled differentially between one wire and two other wires.

The couplers are published in ETSI TR 101 562.

Figure 10:
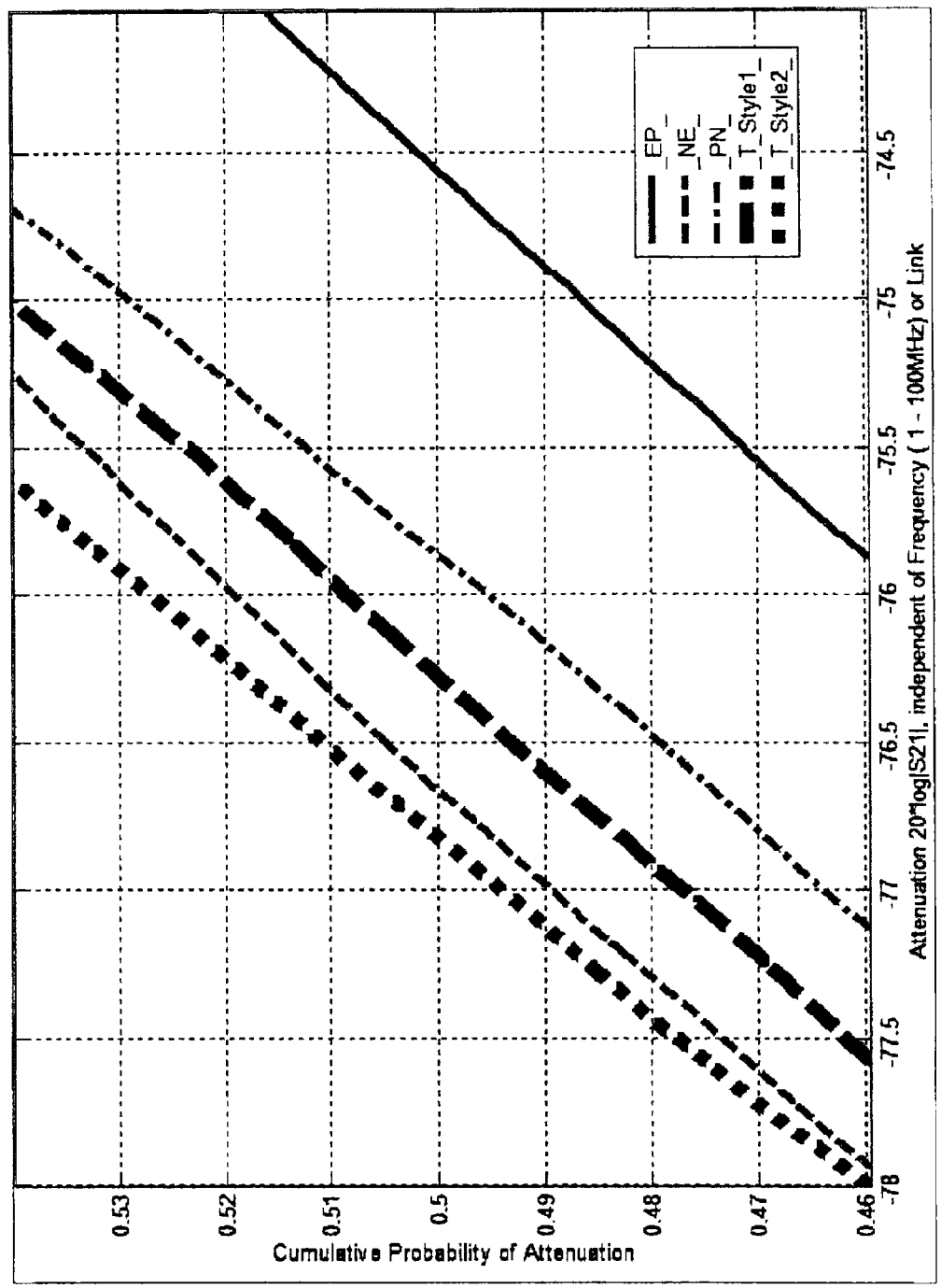
FIG. 10 shows a measurement result obtained for feeding power line communication signals into different combination of wires using a delta style coupler and a T-style coupler.

In FIG. 10, also the attenuation from feeding to an outlet 308 to the reception of the signals at an antenna 310, 312 is depicted. For comparison, differential mode feeding in EP (protective earth line-phase line) is presented with a slim solid line, NE (neutral line-protective earth line) is a slim dashed line, PN (phase line-neutral line) is a slim dashed-dotted line. Here additionally the feedings on the T-style coupler 900 are presented using the fat dashed line when feeding on S1 at the T-style coupler 900 (T-style1) (i.e. differentially between phase and neutral, with a termination of the midpoint between phase and neutral towards protective earth via S2) and using the fat dotted line when feeding on S2 at the T-style coupler 900 (T-style2) (i.e. differentially between protective earth and the combination of phase and neutral, with a termination via S1). The x-axis shows the S21 parameter from −78 dB to −75 dB. The y-axis shows the cumulative probability of the attenuation. It can be seen that signals fed in T-style radiate less than the signals fed in delta style.

Feeding in T-style1 generates roughly 0.5 dB less radiation compared to feeding in PN (phase-neutral). Feeding into T-style2 causes roughly 1.0 dB less radiation than feeding to PN (phase-neutral) at the 50% point.

Consequently the controller 130 might be adapted to feed a signal with 0.5 dB more transmit power when using a T-style coupler and when the signal is coupled differentially between phase and neutral with a termination of the midpoint between phase and neutral towards protective earth than when coupling the signal between phase and neutral without termination and/or the controller might be adapted to feed a signal with 1 dB more transmit power when using a T-style coupler and when the signal is coupled differentially between protective earth and the midpoint of phase and neutral than when coupling the signal between phase and neutral without termination.

Consequently, when potential of interference for all feeding styles should be considered identical, power line communication modems can improve their transmission characteristics by adopting their individual feeding power spectral density (PSD).

The invention claimed is:

1. A power line communication modem, comprising:
   circuitry configured to
      connect the power line communication modem to at least a phase line, a neutral line and a protective earth line of a power line network;
      transmit, using a T-style coupler, a first differential signal using a first transmit power via a first combination of at least two of the phase line, the neutral line and the protective earth line;
      transmit, using the T-style coupler, a second differential signal using a second transmit power via a second combination of at least two of the phase line, the neutral line and the protective earth line, the second transmit power being different from the first transmit power and the first combination being different from the second combination; and individually control the first transmit power of the first differential signal and the second transmit power of the second differential signal, the first and second transmit powers being adjusted in accordance to a potential of interference with radio broadcast services and respectively being determined based on attenuation levels between the first combination of the phase line, the neutral line and the protective earth line and the second combination of the phase line, the neutral line and the protective earth line.

2. The power line communication modem according to claim 1, wherein the circuitry is further configured to feed a differential signal via a combination of the protective earth line and the phase line with 1 dB less transmit power than a differential signal via a combination of the phase line and the neutral line.

3. The power line communication modem according to claim 1, wherein the circuitry is further configured to feed a differential signal via a combination of the neutral line and the protective earth line with 1 dB more transmit power than a differential signal via a combination of the phase line and the neutral line.

4. The power line communication modem according to claim 1, wherein the circuitry is further configured to
feed a differential signal with 0.5 dB more transmit power, using the T-style coupler, when the differential signal is coupled differentially between phase and neutral with a termination of a midpoint between phase and neutral towards protective earth than when coupling the differential signal between phase and neutral without the termination, or
feed a differential signal with 1 dB more transmit power, using the T-style coupler, when the differential signal is coupled differentially between protective earth and the midpoint of the phase and the neutral than when coupling the differential signal between the phase and the neutral without the termination.

5. The power line communication modem according to claim 1, wherein the circuitry is further configured to
transmit, using the T-style coupler, a third differential signal via a third combination of at least two of the phase line, the neutral line and the protective earth line, the third combination being different from the first combination and the second combination, and
individually control a third transmit power of the third differential signal, wherein the third transmit power is different from the first and second transmit powers.

6. The power line communication modem according to claim 1, further comprising:
a memory configured to store a power difference value, wherein
the circuitry is configured to feed the first differential signal with the first transmit power and the second differential signal with the second transmit power wherein the stored power difference value is the difference between the first transmit power and the second transmit power.

7. The power line communication modem according to claim 1, further comprising:
a memory configured to store a power quotient value, wherein
the circuitry is configured to feed the first differential signal with the first transmit power and the second differential signal with the second transmit power wherein the stored power quotient value is the quotient between the first transmit power and the second transmit power.

8. The power line communication modem according to claim 1, wherein
the circuitry is further configured to measure voltages between the phase line, the neutral line and the protective earth line and to determine the phase line and the neutral line based on measuring the voltages.

9. The power communication system comprising:
at least two power line communication modems according to claim 1, which are connected via the phase line, the neutral line and the protective earth line of the power line network.

10. The power line communication modem according to claim 6, wherein the power difference value is independent of frequencies of the first or second differential signals.

11. The power line communication modem according to claim 6, wherein
the circuitry is further configured to
transmit, using the T-style coupler, a third differential signal via a third combination of at least two of the phase line, the neutral line and the protective earth line; and
individually control a third transmit power of the third differential signal, the third transmit power being different from the first and second transmit powers, and the third combination being different from the first combination and the second combination, and
the power difference value is independent of frequency of the third differential signal.

12. The power line communication modem according to claim 7, wherein the power quotient value is independent of frequencies of the first or second differential signals.

13. The power line communication modem according to claim 7, wherein
the circuitry is further configured to
transmit, using the T-style coupler, a third differential signal via a third combination of at least two of the phase line, the neutral line and the protective earth line; and
individually control a third transmit power of the third differential signal, the third transmit power being different from the first and second transmit powers, and the third combination being different from the first combination and the second combination, and
the power quotient value is independent of frequency of the third differential signal.

14. A power line communication method, comprising:
transmitting, using a T-style coupler, a first differential signal using a first transmit power via a first combination of at least two of at least a phase line, a neutral line and protective earth line of a power line network from a first power line communication modem to a second power line communication modem;
transmitting, using the T-style coupler, a second differential signal using a second transmit power via a second combination of at least two of the phase line, the neutral line and the protective earth line of the power line network from the first power line communication modem to the second power line communication modem, the first combination being different from the second combination; and
adjusting the first transmit power of the first differential signal to be different from the second transmit power of the second differential signal, the first transmit power of the first differential signal and the second transmit power of the second differential signal being adjusted in accordance to the potential of interference with radio broadcast services and respectively being determined based on attenuation levels between the first combination of the phase line, the neutral line and the protective earth line and the second combination of the phase line, the neutral line and the protective earth line.

15. The power line communication method according to claim 14, further comprising:
transmitting, using the T-style coupler, a third differential signal with a third transmit power via a third combination of at least two of the phase line, the neutral line and the protective earth line of the power line network from the first power line communication modem to the second power line communication modem, wherein
the third transmit power is different from the first and second transmit powers, and
the third combination is different from the first combination and the second combination.

\* \* \* \* \*